(12) United States Patent
Ardisana, II et al.

(10) Patent No.: US 9,492,967 B2
(45) Date of Patent: *Nov. 15, 2016

(54) METHODS FOR ATTACHING STRUCTURES USING HEAT ACTIVATED THERMOSET FILM AND INDUCTION HEATING

(71) Applicant: Apple Inc., Cupertino, CA (US)

(72) Inventors: John B. Ardisana, II, Shanghai (CN); Eric S. Jol, San Jose, CA (US); Edward Siahaan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/254,431

(22) Filed: Apr. 16, 2014

(65) Prior Publication Data

US 2015/0298392 A1    Oct. 22, 2015

(51) Int. Cl.
```
B29C 65/32      (2006.01)
B29C 65/48      (2006.01)
B29C 65/36      (2006.01)
B29C 65/50      (2006.01)
B29L 31/36      (2006.01)
B29C 65/00      (2006.01)
B29C 65/78      (2006.01)
B29K 101/10     (2006.01)
```

(52) U.S. Cl.
CPC ......... *B29C 65/4835* (2013.01); *B29C 65/368* (2013.01); *B29C 65/3644* (2013.01); *B29C 65/3652* (2013.01); *B29C 65/3676* (2013.01); *B29C 65/5021* (2013.01); *B29C 65/5057* (2013.01); *B29C 66/1122* (2013.01); *B29C 66/545* (2013.01); *B29C 66/61* (2013.01); *B29C 65/32* (2013.01); *B29C 65/78* (2013.01); *B29C 66/50* (2013.01); *B29K 2101/10* (2013.01); *B29L 2031/36* (2013.01)

(58) Field of Classification Search
CPC ... B29C 65/32; B29C 65/4835; B29C 65/78; B29C 66/50; B29C 66/61; B29C 66/545; B29C 66/1122; B29C 65/5057; B29C 65/5021; B29C 65/368; B29C 65/3676; B29C 65/3644; B29C 65/3652; B29K 2101/10; B29L 2031/36
USPC .......................................................... 156/245
See application file for complete search history.

(56) References Cited

U.S. PATENT DOCUMENTS

| | | | |
|---|---|---|---|
| 5,716,410 A | * | 2/1998 | Wang ........................ A61F 2/88 604/531 |
| 6,861,138 B1 | | 3/2005 | Pfaff et al. |
| 7,944,703 B2 | | 5/2011 | Ni et al. |

(Continued)

*Primary Examiner* — Philip Tucker
*Assistant Examiner* — Vicki Wu
(74) *Attorney, Agent, or Firm* — Kilpatrick Townsend & Stockton LLP

(57) ABSTRACT

An electronic device assembly may have electronic components enclosed within plastic and/or metal housing structures. The assembly may include first and second housing structures that are joined using heat activated thermoset polymer film. The heat activated thermoset polymer film may be heated using a metal structure such as a strip or pattern of metal that is placed along or near a joint between the first and second housing structures. The temperature of the metal and associated layers of the thermoset polymer film may be raised by heating the metal using external equipment such as an induction heater. The metal layer that is heated using electromagnetic induction may be formed on the heat activated thermoset film or may be formed in or on one of the housing structures adjacent to the heat activated thermoset polymer film.

16 Claims, 10 Drawing Sheets

(56) References Cited

U.S. PATENT DOCUMENTS

| | | |
|---|---|---|
| 9,044,898 B2 * | 6/2015 | Lozano Villarreal ............ B29C 66/1224 |
| 2003/0127727 A1 * | 7/2003 | Suehiro ............... H01L 23/3677 257/712 |
| 2004/0021249 A1 * | 2/2004 | Weber ..................... B29C 65/18 264/248 |
| 2009/0004465 A1 * | 1/2009 | Kano ...................... C23C 18/28 428/336 |
| 2010/0163173 A1 | 7/2010 | Chiu |
| 2012/0152792 A1 * | 6/2012 | Chun ................ B29C 45/14065 206/524.1 |
| 2013/0000811 A1 * | 1/2013 | Engeldinger .............. C09J 5/06 156/60 |
| 2013/0016050 A1 | 1/2013 | Allore et al. |
| 2013/0255875 A1 * | 10/2013 | Lozano Villarreal ............ B29C 66/1224 156/250 |
| 2014/0117006 A1 | 5/2014 | Wright et al. |

* cited by examiner

METHODS FOR ATTACHING STRUCTURES USING HEAT ACTIVATED THERMOSET FILM AND INDUCTION HEATING

BACKGROUND

This relates generally to electronic devices and, more particularly, to assembling components for an electronic device.

Electronic devices may include printed circuit boards and other internal components. A connector, for example, may include electrical wires for conveying electrical signals to and from a plurality of input-output pins on the connector. These elements may be mounted in a housing. With some devices, it may be desirable to form the housing from mating plastic housing structures.

Mating housing structures can be attached to each other using screws. However, screws may be unsightly. Other techniques may therefore be used that secure plastic housing structures without visible fasteners. For example, techniques for bonding plastic housing structures together such as ultrasonic welding, adhesive, and temperature bonding film may be used to avoid visible fasteners. These techniques may, however, pose manufacturing challenges. Ultrasonic welding can be used to join mating plastic parts, but may produce inconsistent results. Adhesives can be flammable, messy, and brittle. Adhesives such as cyanoacrylate adhesive can be susceptible to cosmetic defects such as blooming. Temperature bonding film (TBF), which is a low melting temperature thermoplastic polymer, may become weakened when an electronic device is operated at elevated temperatures.

To avoid these issues, heat activated thermoset films are sometimes used to bond housing structures of an electronic device assembly together. In a typical arrangement, the entire electronic device assembly is placed in a high temperature environment to activate the heat activated thermoset film. Many materials are not able to endure this type of high temperature environment, which limits the applications in which heat activated thermoset films can be used.

It would therefore be desirable to be able to provide improved ways in which to join components for an electronic device such as plastic and/or metal housing structures.

SUMMARY

An electronic device may include electronic components enclosed within a plastic housing. The electronic device may, for example, be a connector such as a data connector. The connector may include a plug having a plurality of input-output pins that electrically connect with a plurality of mating input-output pins in a mating connector port in an electronic device.

A connector assembly may include housing structures such as a connector body that houses electrical wires in the connector and a plastic cover structure that surrounds a portion of the connector body. The connector may be assembled by attaching the cover structure to the connector body.

Structures in an electronic device assembly such as first and second housing structures of a connector may be joined using heat activated thermoset polymer film. Heat activated thermoset polymer film may be heated using a metal structure such as a thin strip of metal or a patterned metal layer that is placed along or near the joint between the first and second structures. The temperature of the metal layer and associated layers of the heat activated thermoset film may be elevated by heating the metal layer using external equipment such as an induction heater.

In one illustrative configuration, a metal layer may be formed between first and second layers of heat activated thermoset polymer material. In another suitable configuration, a metal layer may be formed in or on one of the structures that are being attached together. For example, a first structure may be insert molded around a metal layer and the metal layer may be heated to raise the temperature of a heat activated thermoset polymer film between the first structure and a second structure. If desired, the metal layer may be attached to a surface of one of the structures using an adhesive.

Using induction heating to heat a metal structure within the electronic device assembly and to thereby activate a heat activated thermoset film may be advantageous as it is a non-contact heating method that only heats the desired metal structure and structures in the vicinity of the metal structure, thereby eliminating the need to place the entire device in a thermal curing oven to activate the heat activated thermoset film. Localized induction heating of an internal metal structure may also help avoid the formation of visible heat-induced artifacts such as plastic discoloration.

DETAILED DESCRIPTION

Electronic devices may include structures such as plastic and/or metal housing structures. Plastic structures may be joined using ultrasonic welding, adhesives, temperature bonding film (e.g., heat activated thermoplastic film), or heat activated thermoset film. Ultrasonic welding may leave visible artifacts along a joined seam. Adhesives may be flammable and may therefore be undesirable when used in products that operate at an elevated temperature. Thermoplastic polymers may become weakened when raised to an elevated temperature during operation of an electronic device.

To overcome these challenges, at least some of the plastic and/or metal structures in an electronic device such as plastic and/or metal housing structures may be joined using thermoset polymers. Thermoset polymers may be raised to an elevated temperature to allow the polymer material to soften and form a bond with other materials. Unlike thermoplastic polymers, which can become soft if returned to an elevated temperature during use, thermoset polymers are generally heat resistant after they have been returned to room temperature following bonding. It may therefore be advantageous to use thermoset polymers such as heat activated thermoset films when forming bonds between respective housing structures.

To form a mechanical bond that attaches plastic and/or metal components to each other, heat activated thermoset polymer material can be raised to a temperature that is above the activation temperature of the thermoset polymer material (e.g., a temperature in the range of about 160-220° C.), while being sufficiently low to avoid damaging the plastic housing portions (i.e., by eliminating or at least minimizing heating of the plastic housing significantly above the glass transition temperature of the plastic housing and thereby avoiding visible damage to the plastic housing). To ensure that heat-induced artifacts such as plastic discoloration are not visible from the exterior of the device, heat may be generated from within or near the joint that is formed where the two components meet.

Figure 1:
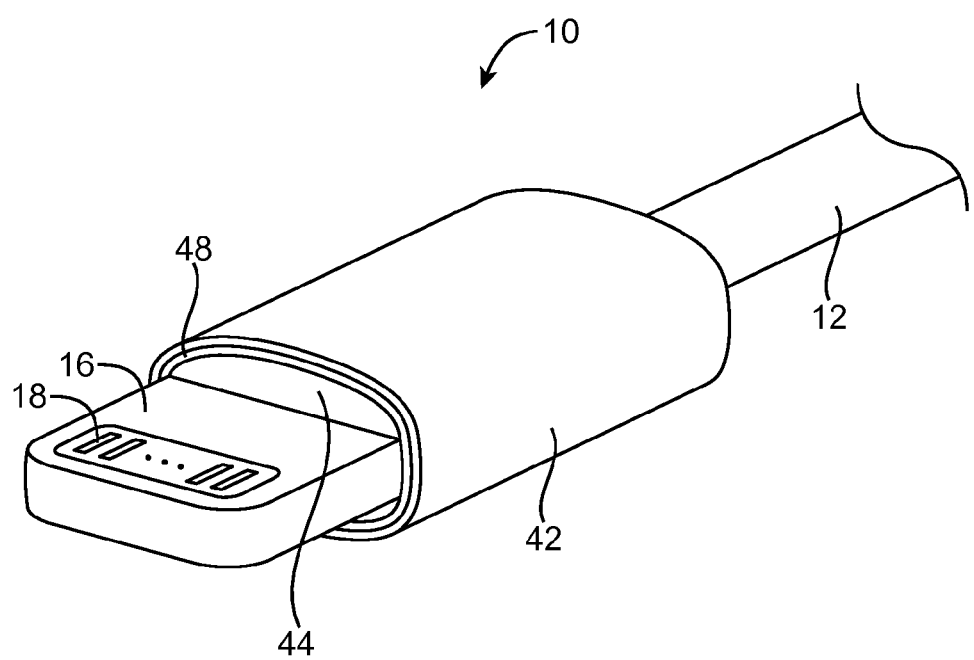
FIG. 1 is a perspective view of an illustrative electronic device of the type that may have components bonded together using one or more heat activated thermoset films in accordance with an embodiment.

An illustrative electronic device of the type that may have plastic and/or metal components that are joined using heat activated thermoplastic film is shown in FIG. 1. In the example of FIG. 1, electronic device 10 is a connector such as a reversible data connector having a plurality of input-output pins 18. Input-output pins 18 may be formed on a plug portion of connector 10 such as plug portion 16. Connector 10 may have any suitable number of input-output pins 18 (e.g., 8 pins, 6 pins, 30 pins, etc.). Input-output pins 18 may be used to electrically couple connector plug 16 to a mating connector port in an electronic device (e.g., a mating female data port connector having a plurality of mating input-output pins) when plug 16 is inserted into the mating connector port.

Connector 10 may be coupled to a connector cable such as connector cable 12. Connector cable 12 may be coupled to a second connector on an opposing end (e.g., a Universal Serial Bus (USB) connector or other suitable connector) and may be used to convey signals between connector 10 and the second connector on the opposing end of cable 12. The connector on the opposing end of cable 12 (not shown) may be an independent connector plug or may be integrated with an accessory device (e.g., a memory card reader, a laptop computer, an audio speaker dock, an alternating current (AC) power adapter, etc.). Data signals and/or power supply signals may be conveyed between an electronic device and an accessory device via connector 10, cable 12, and a second connector on an opposing end of cable 12.

Connector 10 may include plastic and metal parts. For example, connector body 44 may be used to house electrical elements in connector 10 such as electrical wires and may include plastic overmold structures and metal shielding structures for shielding the wires in connector 10. As shown in FIG. 1, a protective covering structure such as polymer sheath 42 may surround a portion of connector body 44 and may be used to cover metal and/or plastic parts on connector body 44. Polymer sheath 42 (sometimes referred to as a boot, cover structure, enclosure, or case) may have a tubular shape and may surround a portion of connector body 44 between plug portion 16 and cable 12.

Cover structure 42 may be attached to connector body 44 using heat activated film such as heat activated thermoset film 48. Heat activated thermoset film 48 may be interposed between cover structure 42 and connector body 44 and may form a mechanical bond between cover structure 42 and connector body 44. As shown in FIG. 1, heat activated thermoset film 48 forms a ring-shaped structure within the ring-shaped structure formed by cover 42. If desired, heat activated thermoset film 48 may form a mechanical bond with both metal and plastic parts on connector body 44 or may form a mechanical bond with only metal or only plastic parts on connector body 44.

Heat activated thermoset film 48 may be formed from a heat activated thermoset polymer material that softens and forms a mechanical bond between components when raised to an elevated temperature (e.g., a temperature that is above the activation temperature of the thermoset polymer material such as a temperature in the range of about 160-220° C.). Unlike thermoplastic polymers, which can become soft if returned to an elevated temperature during use, thermoset polymer material 48 may be heat resistant after it is returned to room temperature following bonding.

The example of FIG. 1 in which heat activated thermoset films are used to join components in a connector (e.g., cover structure 42 and connector body 44 of connector 10) is merely illustrative. In general, heat activated thermoset film such as film 48 may be used to join components in any suitable electronic device. For example, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

To ensure that heat-induced artifacts such as plastic discoloration are not visible from the exterior of device 10, heat may be generated from within or near the joint that is formed where the two components meet. For example, heat may be applied to a metal structure on or near heat activated film 48 in device 10 using electromagnetic induction. With this type of arrangement, an induction heater may be used to create an alternating magnetic field. When the metal structure is placed within the alternating magnetic field, eddy currents may be generated in the metal structure which in turn will raise the temperature of the metal structure and heat adjacent heat activated thermoset film 48.

Using induction heating to heat a metal structure within device 10 and to thereby activate film 48 may be advantageous as it is a non-contact heating method that only heats the desired metal structure and components in the vicinity of the metal structure, thereby eliminating the need to place the entire device in a high temperature environment to activate film 48. Localized induction heating of an internal metal structure may also help avoid the formation of visible heat-induced artifacts such as plastic discoloration.

Figure 2:
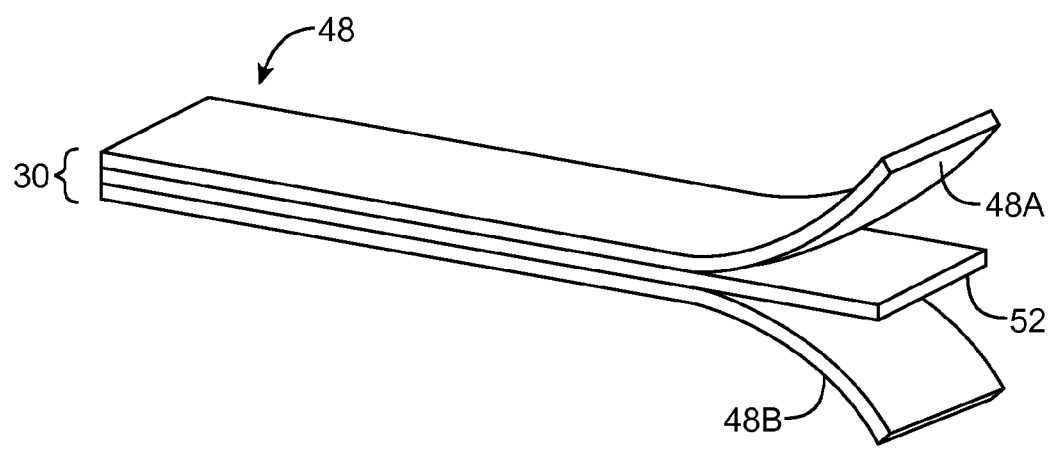
FIG. 2 is a perspective view showing how a layer of metal may be formed between first and second layers of heat activated thermoset film in accordance with an embodiment.

A perspective view of an illustrative arrangement for heat activated thermoset film 48 is shown in FIG. 2. In the example of FIG. 2, heat activated thermoset film 48 includes first and second layers 48A and 48B of heat activated thermoset film. A layer of conductive material such as conductive material 52 may be interposed between heat activated thermoset films 48A and 48B to form heat activated film structure 30. Conductive material 52 may be a layer of metal (e.g., a conductive metal foil) that has been coated onto heat activated film 48 (e.g., onto one or both of heat activated films 48A and 48B). If desired, conductive material 52 may be a material having a high magnetic permeability such as an iron-based material to facilitate induction heating of material 52.

Coating equipment such as roller equipment may be used to roll a layer of conductive foil onto the surface of heat activated film 48. If desired, other types of conductive materials (e.g., conductive polymers, metal silicides, etc.) may be formed between heat activated films 48A and 48B. Conductive material 52 may be in sheet form (e.g., aluminum foil or copper foil), may be formed from patterned metal traces, or may be a structure that is used as a substrate for one or both layers of heat activated film 48. The use of roller-based lamination equipment to laminate metal layer 52 between heat activated films 48A and 48B to form structure 30 is merely illustrative.

Heat activated thermoset films 48A and 48B may, for example, be formed from a liquid precursor that is cured to form films 48A and 48B. The liquid precursor may be sprayed, rolled, or otherwise deposited onto the surface of a release liner or may be deposited directly on metal layer 52. Once cured, films 48A and 48B may be solid at room temperature.

Structure 30 may be used to attach components together in an assembly. For example, heat activated film 48 of FIG. 1 may be formed using a structure of the type shown in FIG. 2. With this type of arrangement, structure 30 may be wrapped to form a tubular structure that surrounds connector body 44 and that is surrounded by cover structure 42. After inserting structure 30 between cover structure 42 and connector body 44, an induction heater may be used to elevate the temperature of metal structure 52 using electromagnetic induction, which in turn may heat films 48A and 48B to thereby mechanically bond cover structure 42 to connector body 44.

Figure 3:
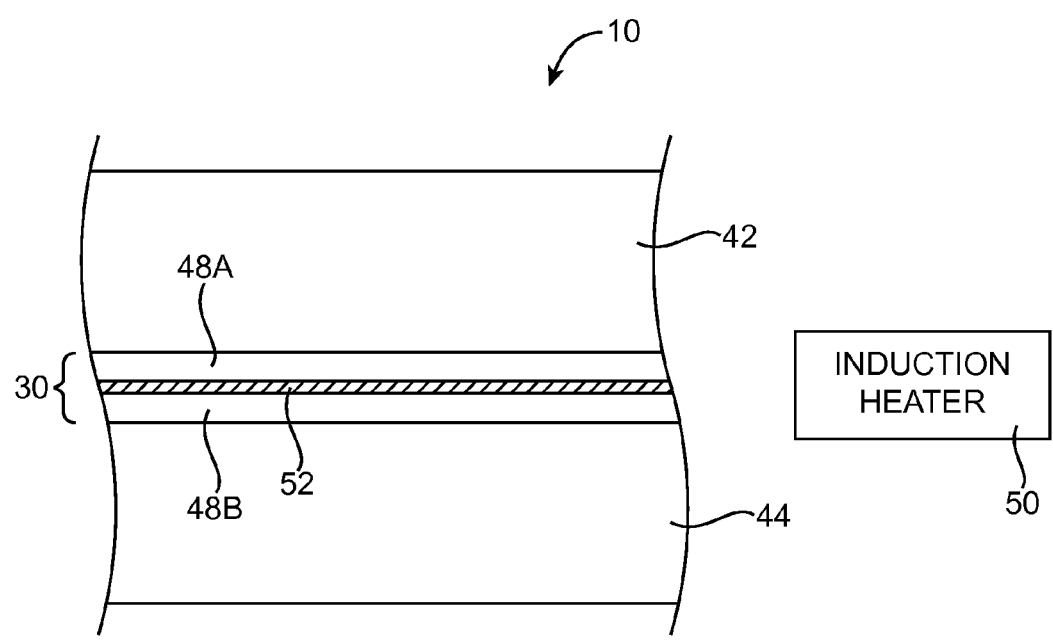
FIG. 3 is a cross-sectional side view showing how first and second components may be bonded together using heat activated thermoset film by induction heating a layer of metal between first and second layers of the heat activated thermoset film in accordance with an embodiment.

FIG. 3 is a cross-sectional side view showing how components such as component 44 and component 42 may be mechanically bonded together using a structure such as structure 30 of FIG. 2. Components 42 and 44 may be components of connector 10 of FIG. 1 or may be components such as housing structures in another suitable assembly. As shown in FIG. 2, structure 30 includes metal layer 52 (e.g., a material having a high magnetic permeability such as an iron-based material) sandwiched between first heat activated thermoset film 48A and second heat activated thermoset film 48B.

An induction heater such as induction heater 50 may be used to heat metal layer 52 using electromagnetic induction. Induction heater 50 may include a power supply and having a radio-frequency signal generator that produces radio-frequency signals at a given frequency and an inductor (e.g., a copper coil) for transferring the energy from the power supply to metal layer 52. When the power supply sends an AC current through the inductor, an alternating magnetic field is generated. When metal layer 52 is placed within this magnetic field, the temperature of metal layer 52 will rise, which in turn will elevate the temperature of heat activated films 48A an 48B. When the temperature of heat activated films 48A and 48B rises above the activation temperature, films 48A and 48B will soften and will form a mechanical bond between component 42 and component 44. Heat activated films 48A and 48B may be characterized by an activation temperature of about 120° C. to 130° C. (or, if desired, about 100-150° C.).

Figure 4:
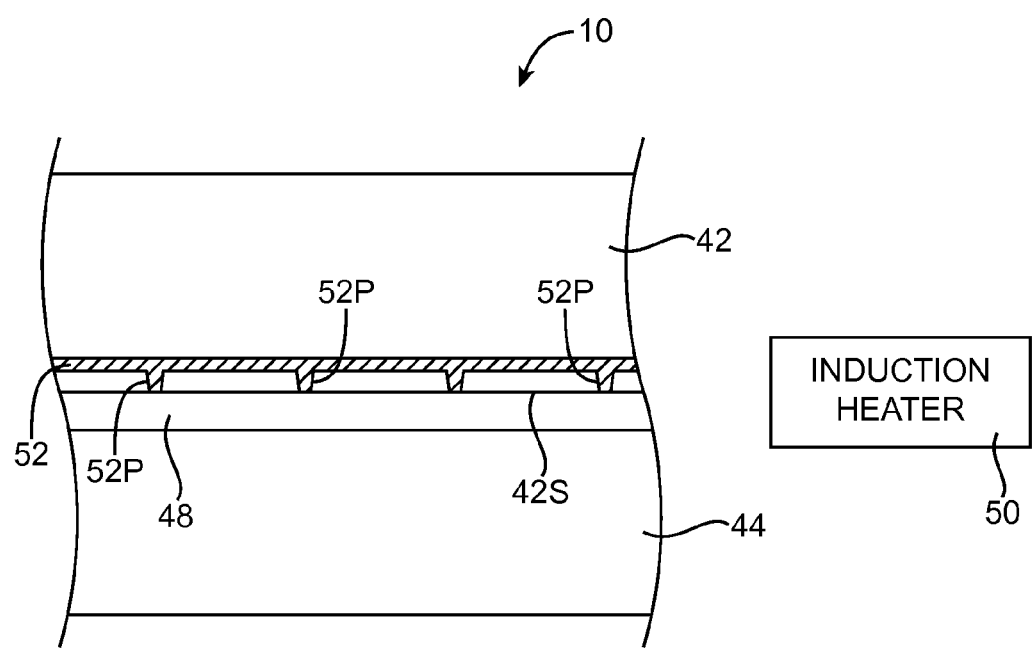
FIG. 4 is a cross-sectional side view showing how first and second components may be bonded together using heat activated thermoset film by induction heating metal in one of the components in accordance with an embodiment.

If desired, heat activated film 48 may be heated using a metal layer 52 that has been formed in or on one or both of components 42 and 44. FIG. 4 is a cross-sectional side view showing an illustrative example in which metal layer 52 has been formed in component 42. In configurations where component 42 is formed from plastic, metal layer 52 may be formed in component 42 by insert molding component 42 around metal layer 52 (as an example).

Metal layer 52 in component 42 may be heated using induction heater 50. Because metal 52 is located near heat activated film 48, the heating of metal 52 may raise the temperature of heat activated film 48 between components 42 and 44 to thereby form a mechanical bond between components 42 and 44.

Metal layer 52 may be formed at the surface of plastic structure 42 (e.g., at surface 42S of component 42 on which film 48 is formed) or may be embedded within plastic structure 42 (e.g., near surface 42S of component 42). In configurations where metal layer 52 is embedded within structure 42, metal layer 52 may include one or more protrusions such as protrusions 52P that extend from the metal portion within plastic structure 42 to inner surface 42S of structure 42 to reach heat activated film 48.

The example of FIG. 4 in which metal layer 52 is located in component 42 is merely illustrative. If desired, metal layer 52 may be located in component 44 or metal layers may be located in both component 42 and component 44.

Figure 5:
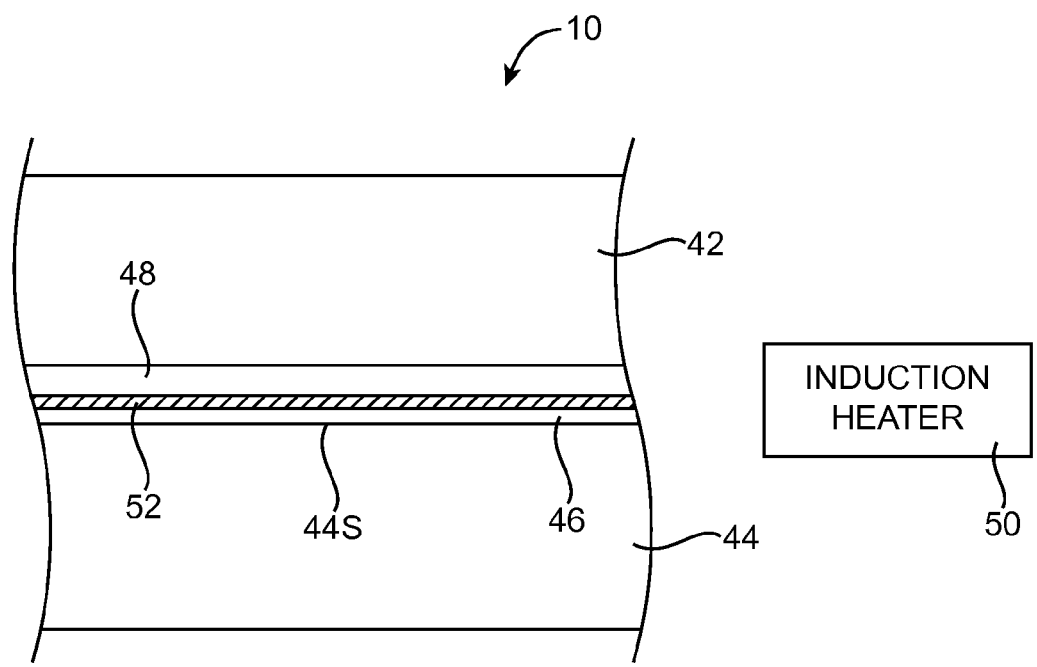
FIG. 5 is a cross-sectional side view showing how first and second components may be bonded together using heat activated thermoset film by induction heating a layer of metal on one of the components in accordance with an embodiment.

FIG. 5 is a cross-sectional side view showing an illustrative example in which metal layer 52 has been formed on the surface of component 44. In the example of FIG. 5, metal layer 52 is attached to component 44 using an adhesive such as adhesive 46 (e.g., a pressure sensitive adhesive or other suitable adhesive). This is, however, merely illustrative. If desired, metal 52 may be deposited directly onto inner surface 44S of component 44 using physical vapor deposition (e.g., sputtering or evaporation), electrochemical deposition, or other techniques for applying metals and other conductive materials to the surfaces of structures.

Heat activated film 48 may be interposed between component 42 and metal layer 52 on structure 44. Metal layer 52 on component 44 may be heated using induction heater 50. Because metal 52 is adjacent to heat activated film 48, the heating of metal 52 may raise the temperature of heat activated film 48 between components 42 and 44 to thereby form a mechanical bond between components 42 and 44.

Figure 6:
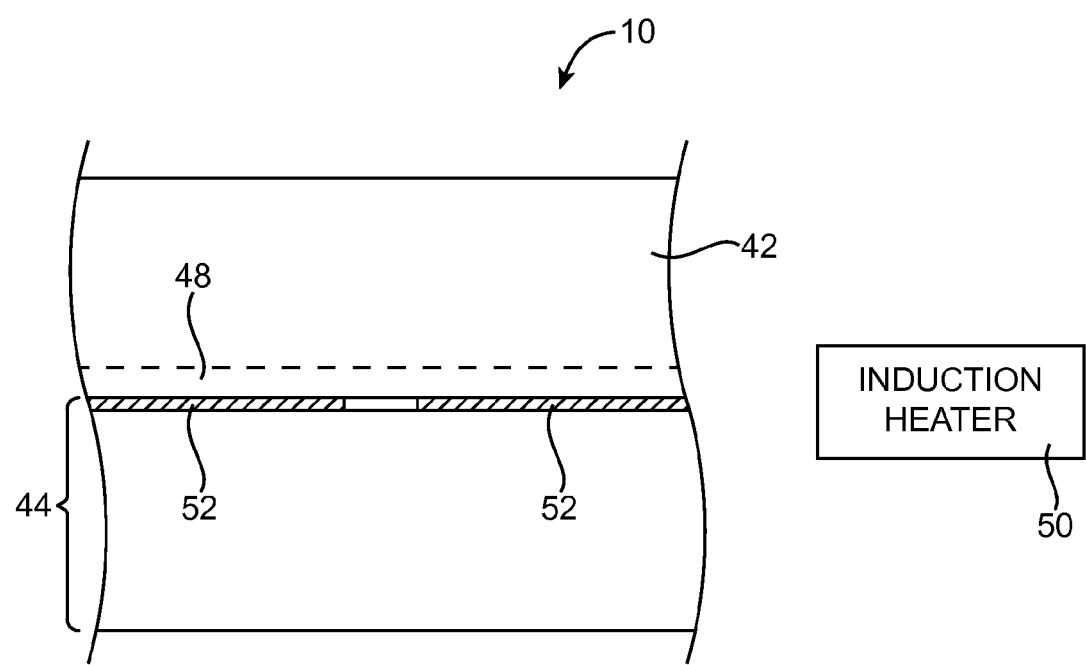
FIG. 6 is a cross-sectional side view showing how first and second components may be bonded together using heat activated thermoset film by induction heating metal structures on one of the components in accordance with an embodiment.

In some assemblies, a component may include metal structures that are close enough to a heat activated film to be used to activate the heat activated film. For example, metal shielding structures in connector 10 of FIG. 1 may be close enough to heat activated film 48 to be used to heat film 48. FIG. 6 is a cross-sectional side view showing an illustrative example in which metal structures that form part of a component in an assembly may be heated to activate a nearby heat activated film.

As shown in FIG. 6, component 44 may include metal structures such as metal structures 52. Metal structures 52 may, for example, be used to shield electrical wires or electrical circuitry in device 10. This is, however, merely illustrative. If desired, metal structures 52 may be metal housing structures, metal support structures, or other suitable structures in component 44.

Heat activated film 48 may be interposed between component 42 and metal structures 52 on structure 44. If desired, heat activated film 48 may be assembled with component 42 (e.g., component 42 may be a plastic component that is formed by insert molding or overmolding plastic onto film 48). Metal structures 52 of component 44 may be heated using induction heater 50. Because metal 52 is adjacent to heat activated film 48, the heating of metal 52 may raise the temperature of heat activated film 48 between components 42 and 44 to thereby form a mechanical bond between components 42 and 44.

Figure 8:
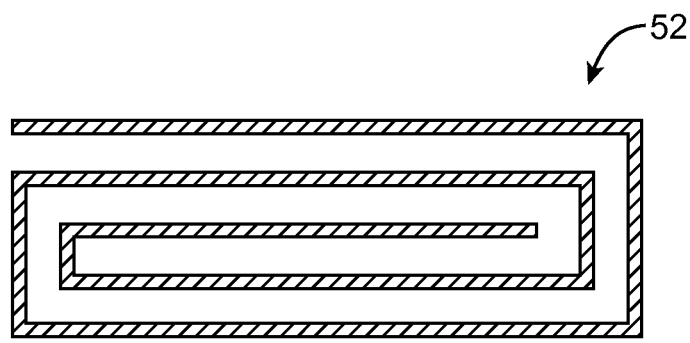
Figure 9:
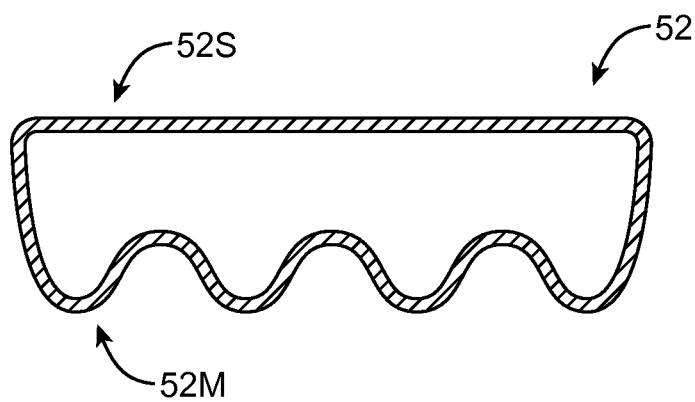

Metal layer 52 need not be formed as a solid metal strip. If desired, metal layer 52 may be patterned or may form a loop. Some shapes or patterns of metal may be more conducive to induction heating than others. If desired, the shape, size, and pattern of metal 52 may be optimized for induction heating. Illustrative patterns that may be used for metal layer 52 of FIGS. 2, 3, 4, 5, and 6 are shown in FIGS. 7, 8, and 9.

Figure 7:
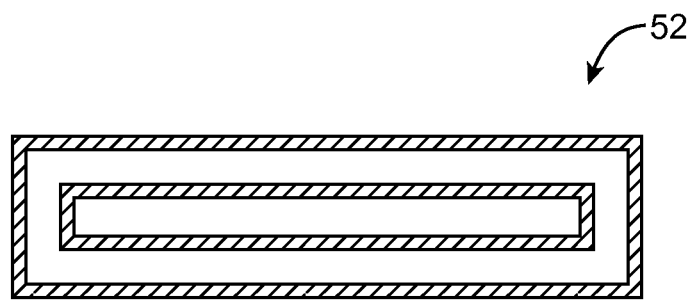
FIGS. 7, 8, and 9 are top views of illustrative patterns of metal traces that may be heated using electromagnetic induction to elevate the temperature of a heat activated thermoset film in accordance with an embodiment.

In the example of FIG. 7, metal layer 52 includes two or more nested loops (e.g., two or more concentric rings) of metal traces. In the example of FIG. 8, metal layer 52 is formed from a single contiguous trace of metal that forms a spiral. The example of FIGS. 7 and 8 in which the lines of metal traces 52 form rectilinear shapes are merely illustrative. If desired, metal 52 may form curved lines. For example, as shown in FIG. 9, metal traces 52 may include straight portions such as straight portion 52S and meandering portions such as meandering portion 52M.

Figure 10:
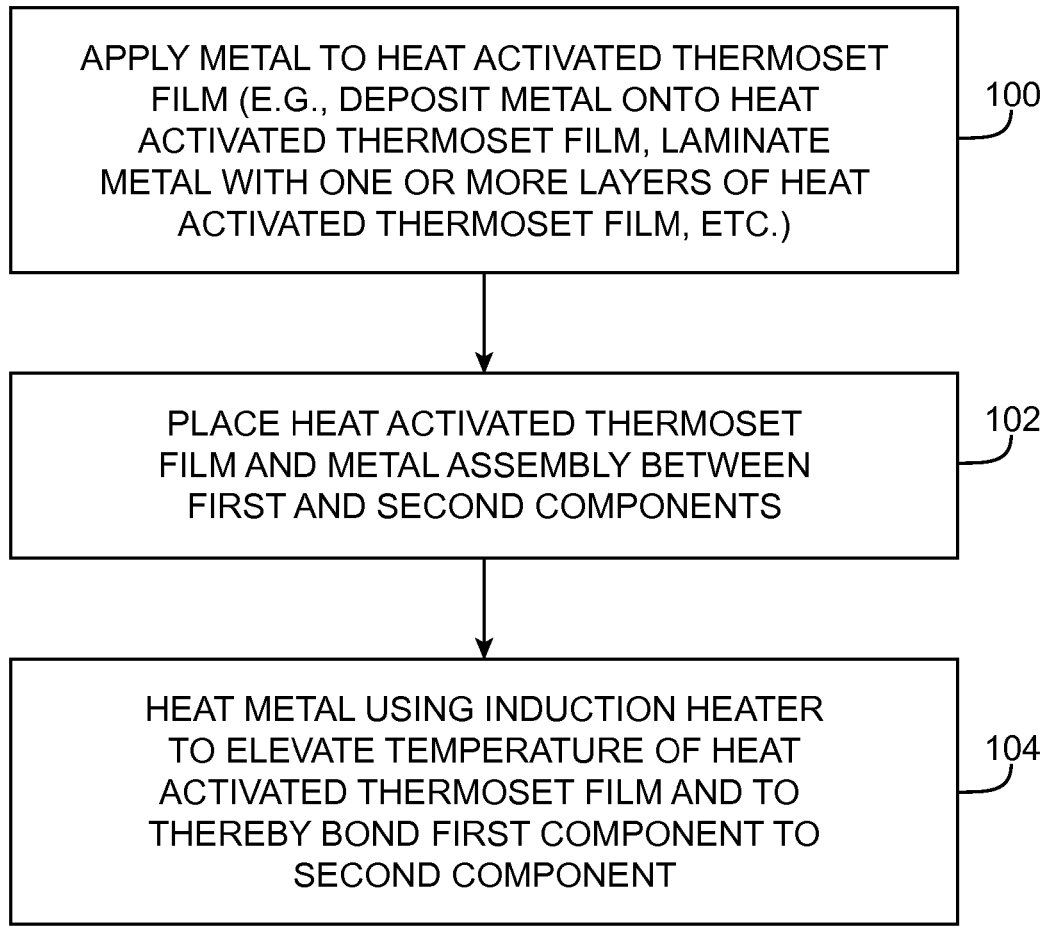
FIG. 10 is a flow chart of illustrative steps involved in bonding first and second components together using heat activated thermoset film by induction heating metal between first and second layers of heat activated thermoset film in accordance with an embodiment.

FIG. 10 is a flow chart of illustrative steps involved in bonding first and second components together by induction heating metal on a heat activated thermoset film.

At step 100, coating tools may be used to apply metal to a heat activated thermoset film. Coating tools may include equipment for depositing metal using physical vapor deposition (e.g., sputtering or evaporation), electrochemical deposition, or other techniques for applying metals and other conductive materials to the surfaces of dielectric structures such as film 48. Patterns may be incorporated into metal layer during the metal deposition processes or, if desired, the metal layer may be patterned using photolithographic equipment, laser processing equipment, or other patterning equipment. If desired, coating tools may include roller equipment for rolling a layer of metal onto the layer of heat activated film. In configurations of the type shown in FIGS. 2 and 3, step 100 may include forming an additional layer of heat activated film over the metal layer such that the metal layer is sandwiched between the two layers of heat activated film (e.g., to form structure 30 of FIGS. 2 and 3).

At step 102, the heat activated thermoset film and metal assembly formed in step 100 may be placed between the first and second components. In configurations of the type shown in FIGS. 2 and 3 in which two layers of heat activated film are used, a first heat activated film may be interposed between the metal layer and the first component, and a second heat activated film may be interposed between the metal layer and the second component.

At step 104, an induction heater may generate an alternating magnetic field and the assembly formed in step 102 may be placed in the magnetic field such that the metal layer on the heat activated film is heated by electromagnetic induction. The elevated temperature of the metal layer may in turn heat the heat activated thermoset film to a temperature at or above its activation temperature. Upon heating the heat activated thermoset film to its activation temperature, the heat activated thermoset film may form a mechanical bond between the first component and the second component.

Figure 11:
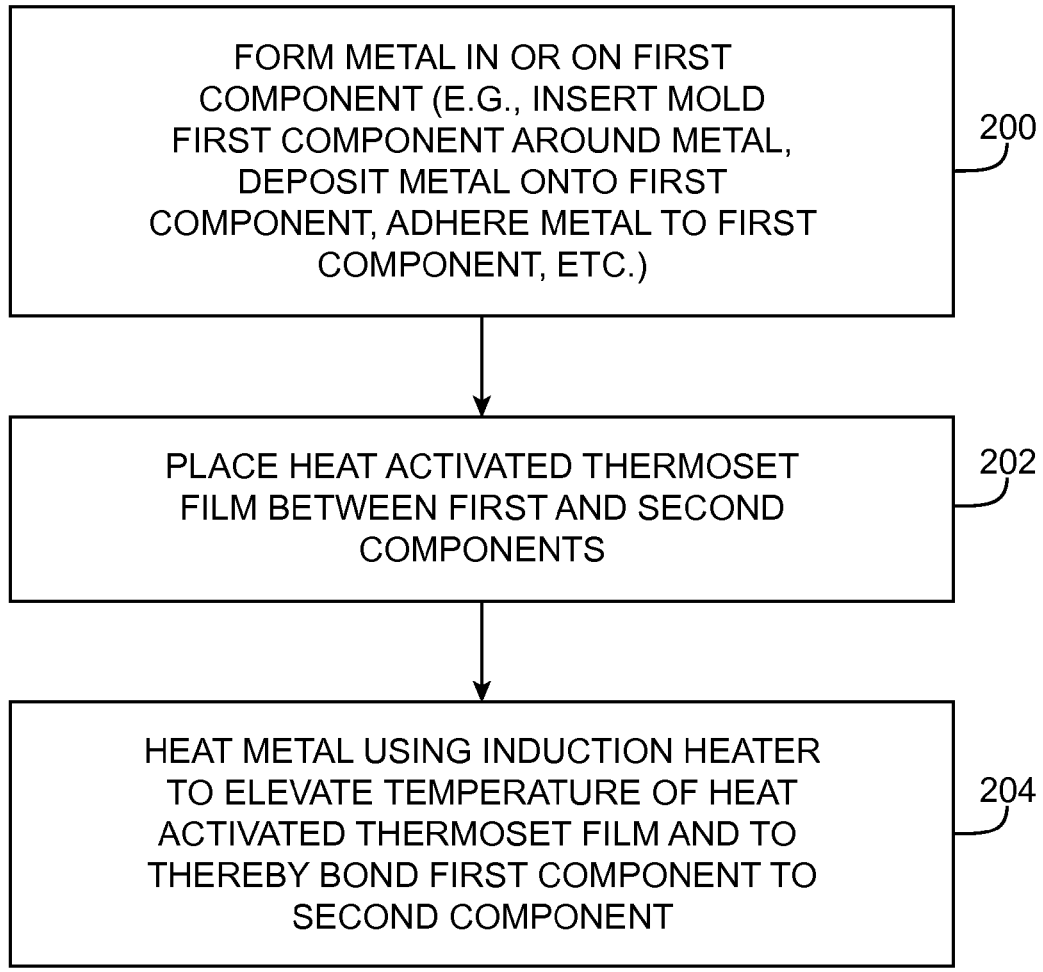
FIG. 11 is a flow chart of illustrative steps involved in bonding first and second components together using heat activated thermoset film by induction heating metal in or on one of the components in accordance with an embodiment.

FIG. 11 is a flow chart of illustrative steps involved in bonding first and second components together by induction heating metal in one of the components to activate a heat activated thermoset film.

At step 200, a metal layer may be formed in or on a first component. In configurations where the first component is formed from plastic, step 200 may include insert molding or overmolding the first component onto the metal layer. In another suitable configuration, the metal layer may be deposited on the surface of the first component using physical vapor deposition (e.g., sputtering or evaporation), electrochemical deposition, or other techniques for applying metals and other conductive materials to the surfaces of dielectric structures. In another suitable configuration, step 200 may include attaching the layer of metal to the surface of the first component using an adhesive (e.g., a pressure sensitive adhesive or other suitable adhesive).

At step 202, a heat activated thermoset film may be placed between the first component (on which metal was formed in step 200) and a second component.

At step 204, an induction heater may generate an alternating magnetic field and the assembly formed in step 202 may be placed in the magnetic field such that the metal layer in or on the first component is heated by electromagnetic induction. The elevated temperature of the metal layer may in turn heat the heat activated thermoset film to a temperature at or above its activation temperature. Upon heating the heat activated thermoset film to its activation temperature, the heat activated thermoset film may form a mechanical bond between the first component and the second component.

Figure 12:
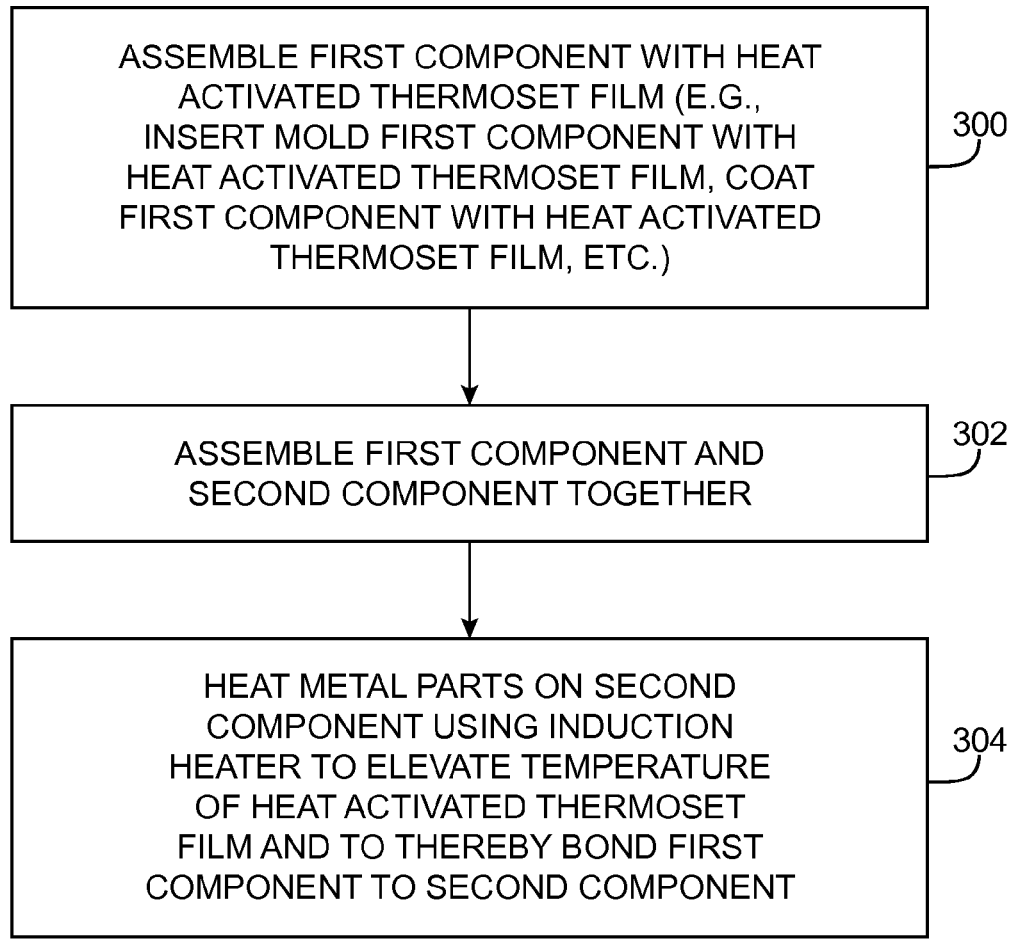
FIG. 12 is a flow chart of illustrative steps involved in bonding first and second components together using heat activated thermoset film by induction heating metal parts on one of the components in accordance with an embodiment.

FIG. 12 is a flow chart of illustrative steps involved in bonding first and second components together by induction heating metal structures in or on one of the components to activate a heat activated thermoset film.

At step 300, a first component may be assembled with a heat activated thermoset film. For example, in configurations where the first component is formed from plastic, step 300 may include insert molding or overmolding the first component onto the heat activated thermoset film. In another suitable configuration, step 300 may include coating the surface of the first component with a heat activated thermoset film (e.g., using spraying equipment, rolling equipment, or other suitable equipment for forming heat activated thermoset film on the surface of the first component).

At step 302, the first component may be assembled with the second component. For example, in configurations of the type shown in FIG. 1 in which the first component is a tubular cover structure and the second component is a connector body of a connector, step 302 may include sliding the tubular cover structure onto the connector body such that the cover structure covers (e.g., surrounds) a portion of the connector body.

At step 304, an induction heater may generate an alternating magnetic field and the assembly formed in step 302 may be placed in the magnetic field such that metal structures on the second component are heated by electromagnetic induction. The metal structures that are heated in step 304 may, for example, be metal shielding structures, metal housing structures, metal support structures, or other metal elements that serve a purpose beyond heating the thermoset film but that are close enough to the thermoset film to elevate the temperature of the thermoset film when heated. Upon heating the heat activated thermoset film to its activation temperature, the heat activated thermoset film may form a mechanical bond between the first component and the second component.

The foregoing is merely illustrative and various modifications can be made by those skilled in the art without departing from the scope and spirit of the described embodiments. The foregoing embodiments may be implemented individually or in any combination.

What is claimed is:

1. A method for attaching a first structure to a second structure in a connector assembly, comprising:
    applying a metal layer to a heat activated thermoset film, wherein the metal layer comprises at least one metal trace that forms a nested loop; and
    while the heat activated thermoset film and the metal layer are interposed between the first and second structures, induction heating the metal layer to raise the heat activated thermoset film to an elevated temperature.

2. The method defined in claim 1 wherein the heat activated thermoset film comprises first and second layers of heat activated thermoset polymer material and wherein induction heating the metal layer comprises induction heating the metal layer between the first and second layers of heat activated thermoset polymer material.

3. The method defined in claim 2 wherein applying the metal layer to the heat activated thermoset film comprises laminating the metal layer between the first and second layers of heat activated thermoset polymer material.

4. The method defined in claim 1 wherein applying the metal layer to the heat activated thermoset film comprises depositing the metal layer onto the heat activated thermoset film using metal deposition equipment.

5. The method defined in claim 1 wherein the metal layer comprises an iron-based material.

6. The method defined in claim 1 wherein at least one of the first and second structures is formed from plastic.

7. The method defined in claim 1 wherein applying a metal layer to the heat activated thermoset film comprises forming a patterned metal layer on the heat activated thermoset film to facilitate induction heating of the metal layer.

8. The method defined in claim 1 wherein the first structure comprises a connector body of a connector, wherein the second structure comprises a cover structure that at least partially surrounds the connector body, and wherein induction heating the metal layer comprises induction heating the metal layer while the cover structure at least partially surrounds the connector body.

9. A method for attaching a first structure to a second structure, comprising:
    insert molding the first structure around a metal layer;
    placing a heat activated thermoset film between the first structure and the second structure; and
    while the heat activated thermoset film is interposed between the first structure and the second structure, induction heating the metal layer of the first structure to raise the heat activated thermoset film to an elevated temperature and to thereby mechanically bond the first structure to the second structure.

10. The method defined in claim 9 wherein the first structure has a surface, wherein placing the heat activated thermoset film between the first structure and the second structure comprises placing the heat activated thermoset film on the surface, and wherein the metal layer comprises protrusions that extend from within the first structure to the surface.

11. The method defined in claim 9 wherein the first structure comprises a plastic structure and wherein the plastic structure surrounds a portion of the second structure.

12. The method defined in claim 11 wherein the second structure houses electrical elements and wherein induction heating the metal layer comprises induction heating the metal layer while the plastic structure surrounds the portion of the second structure.

13. A method for attaching a first structure to a second structure in a connector assembly, comprising:
    placing a heat activated thermoset film between the first structure and the second structure; and
    while the heat activated thermoset film is interposed between the first structure and the second structure, induction heating a metal layer on the heat activated thermoset film to raise the heat activated thermoset film to an elevated temperature and to thereby mechanically bond the first structure to the second structure, wherein the first structure forms a connector sheath, wherein the second structure forms a connector body that is received within the connector sheath, and wherein induction heating the metal layer comprises induction heating the metal layer while the connector body is received within the connector sheath.

14. The method defined in claim 13 wherein the first structure comprises a ring-shaped plastic structure having an inner surface, wherein the heat activated thermoset film comprises a ring-shaped heat activated thermoset film, and wherein placing the heat activated thermoset film between the first structure and the second structure comprises placing the ring-shaped heat activated thermoset film within the ring-shaped plastic structure adjacent to the inner surface.

15. The method defined in claim 13 wherein the first structure comprises plastic, wherein the heat activated thermoset film is characterized by an activation temperature, and wherein induction heating the metal layer comprises induction heating the metal layer to a temperature that is above the activation temperature and that is insufficient to visibly damage the first and second structures.

16. The method defined in claim 13 wherein the heat activated thermoset film comprises first and second layers of heat activated thermoset polymer material and wherein induction heating the metal layer comprises induction heating the metal layer between the first and second layers of heat activated thermoset polymer material.

* * * * *